US006989818B2

(12) United States Patent
Biheller et al.

(10) Patent No.: US 6,989,818 B2
(45) Date of Patent: Jan. 24, 2006

(54) INPUT CONTROLLER FOR A GAME SYSTEM HAVING A COMBINATION MOVE FEATURE

(75) Inventors: Jason A. Biheller, Malibu, CA (US); Kevin Ryding, Winthrop (AU); Christopher F. Richards, Fountain Hills, AZ (US)

(73) Assignee: Electro Source, Inc., Vernon, CA (US)

( * ) Notice: Subject to any disclaimer, the term of this patent is extended or adjusted under 35 U.S.C. 154(b) by 173 days.

(21) Appl. No.: 10/289,340

(22) Filed: Nov. 7, 2002

(65) Prior Publication Data

US 2004/0090416 A1    May 13, 2004

(51) Int. Cl.
*G09G 5/00*    (2006.01)
(52) U.S. Cl. .................... 345/156; 341/22; 345/161; 345/169; 345/172; 345/177; 379/433.06; 463/29; 463/37; 463/39; 463/44
(58) Field of Classification Search ............... 345/156, 345/161, 169, 172, 177; 463/29, 37, 39, 463/44; 341/22; 379/433.06
See application file for complete search history.

(56) References Cited

U.S. PATENT DOCUMENTS

| 5,259,626 | A | * | 11/1993 | Ho | 463/37 |
| 5,759,100 | A | * | 6/1998 | Nakanishi | 463/37 |
| 6,559,778 | B1 | * | 5/2003 | Hillmering | 341/23 |
| 6,722,984 | B1 | * | 4/2004 | Sweeney et al. | 341/176 |
| 2004/0058733 | A1 | * | 3/2004 | Hussaini et al. | 463/47 |
| 2004/0075602 | A1 | * | 4/2004 | Griesau et al. | 341/176 |

OTHER PUBLICATIONS

Mad Catz Inc., 2000, Dual Force 2 Controller Manual for PlayStation®2, PSone and PlayStation®.*

* cited by examiner

*Primary Examiner*—Sumati Lefkowitz
*Assistant Examiner*—Alexander S. Beck
(74) *Attorney, Agent, or Firm*—Hoffman, Wasson & Gitler, PC

(57) ABSTRACT

A manual input video game controller to be used with various video game machines for the purpose of controlling a game displayed upon a video monitor. The manual input video controller would include a plurality of digital action buttons along with a separate combination button allowing various combination maneuvers to be programmed into the video game controller in real time. The use of this combination button along with one of the input controllers would allow a particular stored combination of maneuvers to be implemented, without the loss of function of any of the digital action buttons.

16 Claims, 5 Drawing Sheets

INPUT CONTROLLER FOR A GAME SYSTEM HAVING A COMBINATION MOVE FEATURE

BACKGROUND OF THE INVENTION

1. Field of the Invention

The present invention is directed to a controller for a computerized game.

2. Description of the Prior Art

In the last 20–25 years, we have witnessed the inception and the development of various audio-visual games in which an individual, through the use of a game controller, would be able to maneuver and control various figures or icons projected upon a display screen. One of the earliest of these games is "Pong" in which one or two players would control the movement of a paddle in generally a rectilinear movement across the display screen for the purpose of hitting a moving spot which is also projected onto the display screen. Generally, this game was played on the user's television monitor controlled by a rudimentary controller.

Relatively quickly, these types of home entertainment games led to the development of various simple arcade games, such as "Battleship". This game included input controllers allowing a player to drop depth charges at various intervals in order to destroy a number of submarines traversing the display screen. While usually diverting, these types of games were rather tame in nature and did not require a high level of hand-eye coordination to become an expert in the game. Furthermore, due to the types of memories and processors utilized in these games, the displays projected onto the screens were rather primitive in nature.

As the technology in creating various graphics illustrated on the display screen has increased, a number of different type of game systems have been developed which greatly enhance the display aspect of the game, as well as to enliven the play of the game. These game systems are provided with various types of controllers including a number of different analog and digital input devices allowing the player to be able to perform and implement more and more sophisticated scenarios. This development has required the player to manipulate one or more of the aforementioned analog or digital inputs to implement various combinations of moves.

Since the game controller is provided with only a limited number of analog or digital input controllers, various manufacturers have endeavored to develop a game controller in which these combination of moves could be produced by a single programmed input button or control. For example, the dual force controller manufactured by Mad Catz contains one or more programmable buttons which can be utilized to produce a combination move after the buttons have been properly programmed. These programmable buttons generally would produce a particular function or result when they are pressed or enabled. However, in the programmable mode, these buttons would lose their individual function, and when depressed or enabled to create the combination move, only the combination move would be produced. Furthermore, programming is done by trial and error since one is required to use a pause button for timing sequences. Additionally, while this device does allow a combination of moves to be produced, there is no implementation to record a move that would require holding the button for a period of time. Therefore, the time between various buttons being depressed to create the combination move would be immaterial to the creation of the combination move.

Another prior art device would be the game "Storm Chaser" produced by Interact. Similar to the game produced by Mad Catz, the individual programmable buttons would also lose their function when they are programmed to produce combination moves. This game would also require that programming being done by trial and error, since one is also required to use the pause button for timing sequence and there is no way to record a move requiring the holding of a button for a period of time.

SUMMARY OF THE INVENTION

The deficiencies of the prior art are overcome by the present invention which is directed to a manual input controller used with a video game machine to control the display of various characters and other images on a video display screen. The video game machine controlled by the manual input controller would be any machine capable of producing the various characters and background scenes, as well as allowing the characters to be manipulated by the manual input controller. Such a video game machine could be the X-Box. However, any other type of video game machine utilized with a manual input controller could be utilized with the teachings of the present invention.

The manual input controller is provided with a plurality of digital and/or analog input devices, including action buttons capable of being manipulated by the user to control the actions of the characters or other displays on the video monitor. One of the input devices would be characterized as a "combo" button allowing the user to program a combination of moves in real time. The action buttons are provided on the right top surface of the controller as the user faces the controller. These action buttons are generally engaged by the fingers on the right hand of the user. The combination button is generally provided on the left side surface of the controller, to be controlled by one of the fingers of the left hand of the user. The controller would be provided with a processor and a non-volatile memory enabling one or more combinations of moves to be programmed in real time to be stored in the non-volatile memory. Once these moves have been programmed and stored in the non-volatile memory, they will remain there even when power is removed from the game controller. These combinations will always be stored in the non-volatile memory until the user either overwrites the combination or combinations or erases these combinations from memory. Once the combination move or moves have been programmed into the non-volatile memory, they can be employed by the user when the combination button is depressed, as well as one other control button which was designated by the user to produce a particular combination move. The particular control button which would initiate the implementation of the combination move (along with the combination button being depressed) would not lose its own particular function when the combination button is not depressed.

It will be appreciated from the foregoing that the present invention represents a significant advance in the manner in which combination moves are programmed and implemented for use with various video game machine. Other aspects and advantages of the present invention will become apparent from the foregoing more detailed description, taken in conjunction with the accompanying drawings.

DETAILED DESCRIPTION OF THE PRESENT INVENTION

Figure 1:
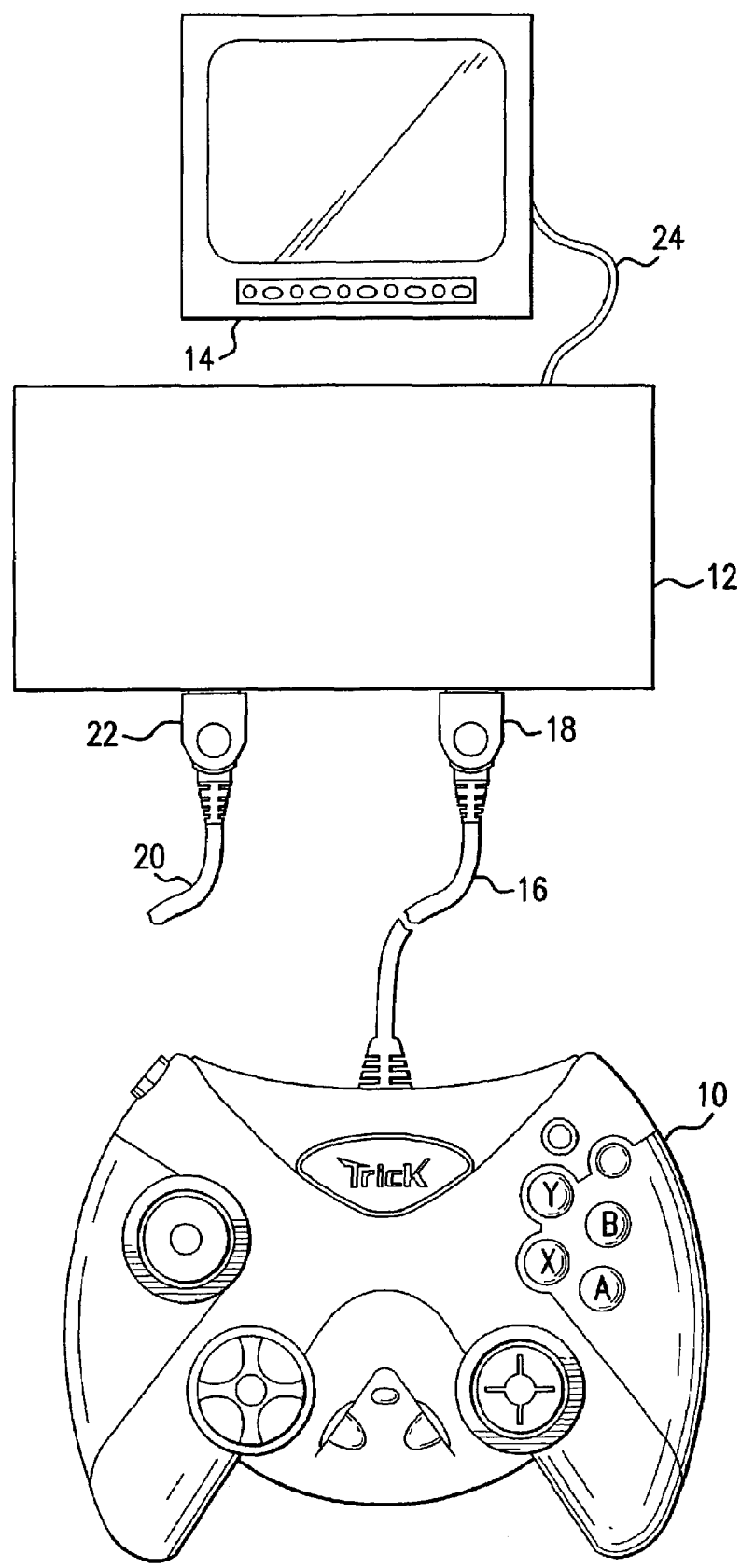
FIG. 1 is a view of the controller of the present invention used with a video game machine.

The manual input video controller 10 used in the present invention is generally illustrated in FIG. 1 showing the manner in which it is employed to control the operation of a video game. The controller 10 is connected to a video game machine 12, such as the X-Box. Although the manual input video game controller of the present invention will be described for use with the X-Box, it is contemplated that the controller of the present invention would be utilized with other types of video game machines. A cable 16 having a plug 18 is used to connect the manual input video game controller 10 to the video game machine 12. Since it is contemplated that two or more players would utilize the manual input video game controller 10 to play a video game, a second cable 20 and second plug 22 is also illustrated.

The video game machine 12 is connected to a video display 14 through the use of a cable 24. Although FIG. 1 shows the game controller 10 connected to the video game machine 12 through the use of the cable 16, other connections, such as a wireless connection, could be utilized. Similarly, a wireless connection could be utilized between the video game machine 12 and the video monitor 14.

Figure 2:
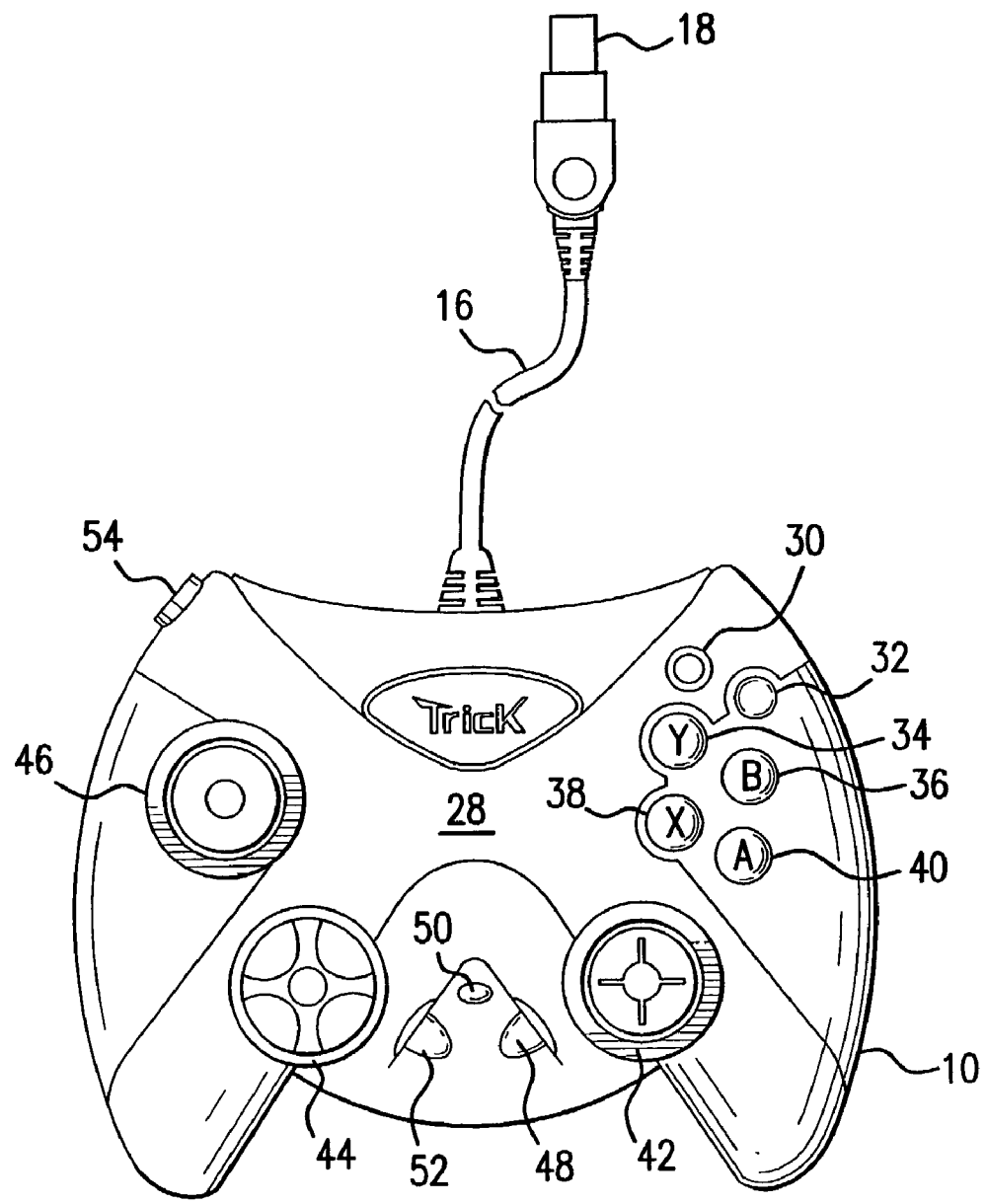
FIG. 2 is a top view of the controller of the present invention.
Figure 3:
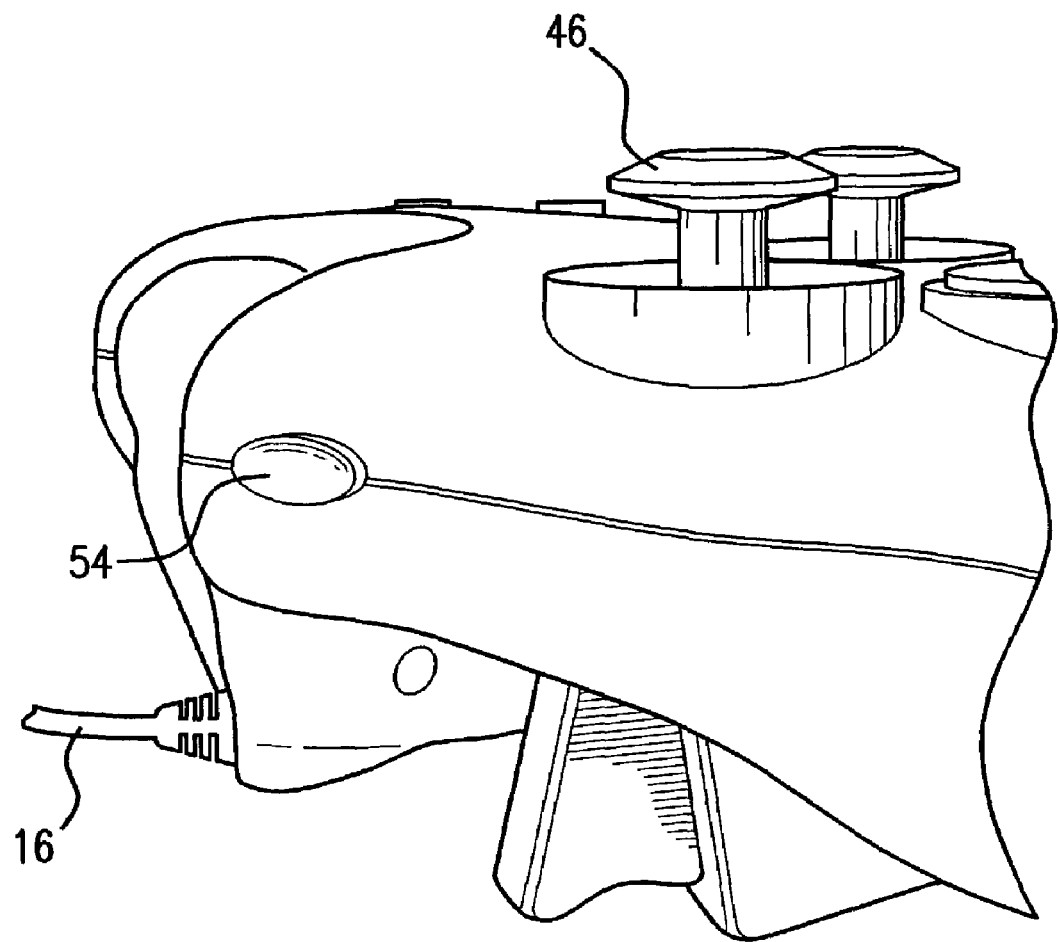
FIG. 3 is a side view of the controller of the present invention showing the combination button.
Figure 4:
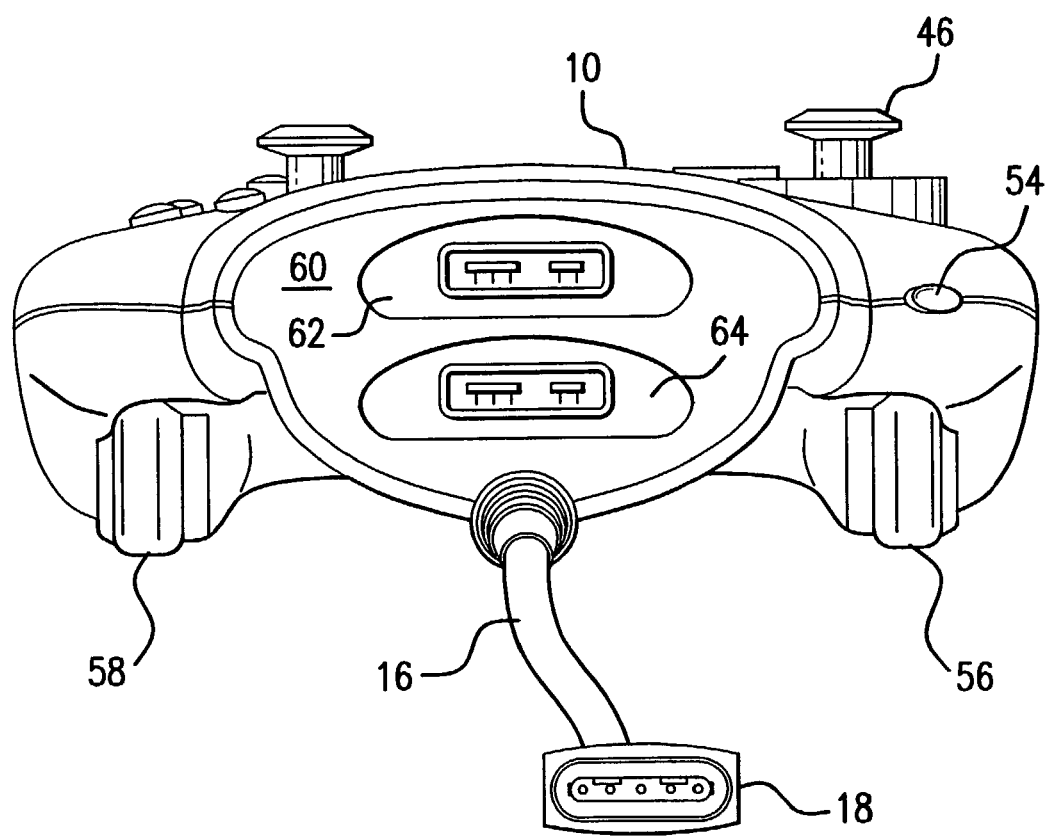
FIG. 4 is an end view of the controller of the present invention.

FIGS. 2, 3 and 4 illustrate the manual input video game controller 10 previously described. The controller includes a plurality of digital action buttons 30, 32, 34, 36, 38 and 40. These digital action buttons are provided on the right top surface of the controller as the user faces the controller, and are therefore, generally operated by the fingers on the right hand of the user. Although six of these action buttons are displayed, it can be appreciated that the exact number of action buttons can be increased or decreased, depending upon the sophistication of the controller. The depression of each of these action buttons 30, 32, 34, 36, 38 and 40 would result in one of the characters displayed on the monitor 14 react in a certain manner to produce a particular move. Two analog control joy stick devices 42 and 46 are included, generally allowing the characters displayed on the monitor 14 to move in different directions or in different manners. A digital pad 44 is also included for allowing the user to manipulate the characters shown in the display 14 to produce various maneuvers. Triggers 56 and 58 provided beneath the top portion of the controller would be used in a manner similar to triggers utilized in various state of the art video games. As can be appreciated, the exact number or types of input devices are not crucial to the operation of the preset invention.

Three control buttons 48, 50 and 52 are provided on the top surface 28 of the controller. One of the buttons 48 is used to initiate the play of the game and a second button 50 is used to proceed backwards in the game. Both of the buttons 48 and 50 are to be depressed for them to operate. A third button 52 is also a depressible button and includes a light emitting diode (LED) therein capable of intermittently flashing at various rates. A combination button 54 is provided on the left side surface of the controller in proximity to one of the analog joy sticks 46 as shown in FIG. 3. The position of the combination button 54 would allow it to be manipulated by one of the fingers of the left hand of the user. Although the exact placement of each of the action buttons 30, 32, 34, 36, 38 and 40, the two analog joy sticks 42 and 46 the digital pad 44, the control buttons 48, 50 and 52 and the combination button 54 are not of crucial importance to the present invention, it is generally important that the aforementioned input devices be situated on the opposite side of the controller from the combination button 54. This would allow the user to operate the combination button with the finger of one hand and the majority of the input devices with the fingers of the other hand. Since the majority of game controllers situate the action buttons on the right side of the controller, the present invention would situate the combination button 54 on the left side of the controller for ease of operation by the user. Consequently, if the majority of the action buttons were provided on the left side of the controller, the combination button 54, would be provided on the right side of the controller.

Turning to FIG. 4, it is noted that the rear surface 60 is provided with two slots 62 and 64 allowing various cartridges to be inserted therein. These cartridges can be utilized for many different purposes, such as the inclusion of extended memories.

Figure 5:
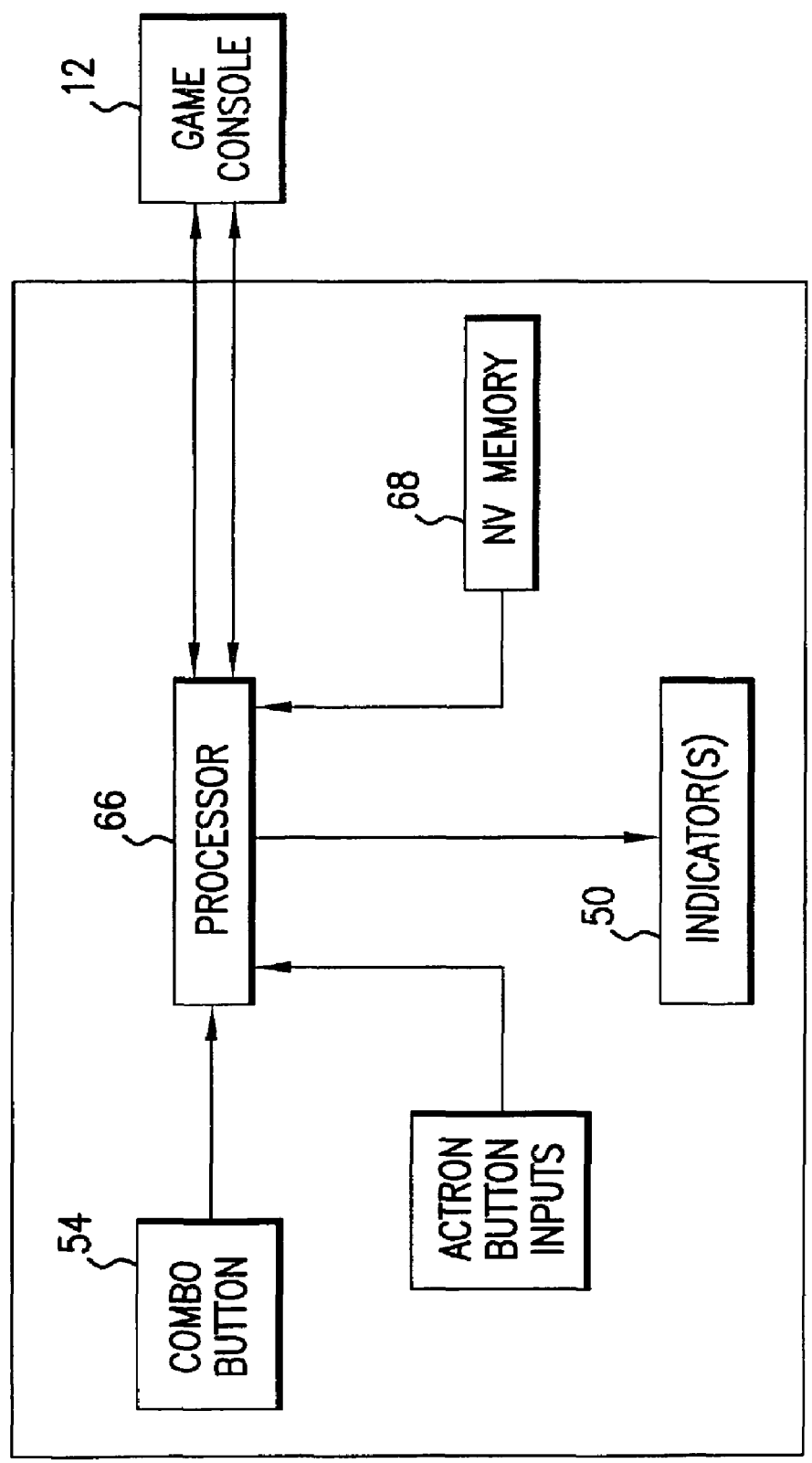
FIG. 5 is a block diagram of the internal operations of the video game controller.

FIG. 5 illustrates a block diagram of the operation of the manual input controller 10. As can be appreciated, the video game machine 12 is provided with various removable software in the form of cartridges, allowing various figures and scenes to be illustrated on the monitor 14. The manual input video controller 10 allows the various figures projected on the display 14 to be manipulated in a number of different manners based upon the activation of the various action buttons and other control devices provided on the controller 10. The utilization of the various action buttons, as well as the movement of the other controls, would be transmitted through the manual input video controller 10 to the video game machine 12 which are then displayed and maneuvered on the monitor 14.

The manual input video game controller is provided with a processor 66 shown in FIG. 5. A non-volatile memory such as EEPROM 68, is connected to the processor. The various action button inputs, other input devices, the input of a combo button 54, as well as the light emitting diode indicator 50 are all in communication with the processor 66. Therefore, all information generated by the manipulation of the various input devices provided on the manual input video controller would pass through the processor 66 and then to the video game machine 12.

As previously indicated, as is true with most state of the art manual input video controllers, the manipulation or the depression of a single control device would result in a single maneuver being performed. Historically, a combination of maneuvers would be performed only by manipulating the action buttons, as well as any of the other input devices in a manner to produce the combination maneuver. The present invention allows various maneuvers to be programmed and stored in the non-volatile memory 68 by the utilization of the combo button 54 and other action button inputs. Once one or more of these combination moves are stored in the manner described hereinbelow, these combination moves can be produced very easily without the necessity of constantly manipulating a number of input devices.

Prior art devices which attempted to utilize a combination move would create these moves when the game would be placed in a pause mode. The present invention would create these moves in real time when the user is playing the game. Additionally, once one of the prior art combination moves was programmed by designating a particular action button, the specific use of that action button would be eliminated until the combination move designating that action button would be erased. The present invention would allow all of the action buttons to continue in their current use even when they are designated as a combination maneuver setting.

If a user wishes to program a series of maneuvers utilizing any or all of the digital input action devices such as the action buttons 30, 32, 34, 36, 38 and 40, the digital pad 44 and the triggers 56, 58, the user would press the program button 52 at which time an light emitting diode included therein would be constantly illuminated. This would occur after the controller has been turned ON prior to playing a game, or during the actual play of the game. At this point, the user would press and release one of the digital input devices, at which time the light emitting diode would flash at a first speed. The combination move will now be created by pressing and holding the combination button 54, generally with one of the fingers of the user's left hand and manipulating one or more of the digital input devices in a sequence to produce the combination move generally with one or more fingers of the user's right hand. Once the individual begins the process of pressing the sequence of digital action buttons, the light emitting diode would flash at a second speed, different than the first speed. When the user has finished the combination of buttons, the combination button 54 would be released and the programming of the combination would be complete. At this point, the light emitting diode would be turned off. A timer is provided within the processor to limit the time of the sequenced combination maneuver. At the present time, this time limit is five seconds. However, as can be appreciated, the exact limit of the timed sequence is not crucial to the present invention. Additionally, the analog values of each of the buttons would be stored, such as how hard the buttons are depressed. These analog values would also be utilized in the sequenced maneuver. Although the movement of the analog joy sticks 42 and 46 are not presently not programmable into the sequence, based upon the type of game being utilized, as well as the processor 66 and the non-volatile memory 68 employed, these buttons could also be utilized in the programmable sequence. If the user takes longer than the pre-programmed time limit to program the sequence, the programming sequence will automatically cease after this time period has elapsed. Once the combination sequence has been programmed, it will be stored in the non-volatile memory 68 even when the controller 10 is not in use. Once the controller is activated, that particular pre-programmed sequence will still remain in the non-volatile memory 68.

Once the user has designated one or more of the digital inputs as the input for a particular combination maneuver, this combination would be played back by pressing that particular digital input button along with the combination button 54. At this point, the combination maneuver will be reenacted including the speed and delays produced by the various sequence of buttons when they were initially recorded. Once the combination button 54 is released, that same digital action button designated to initiate one of the combination moves, would revert back to its original function. Therefore, since that particular action button does not lose its original function, the use of the combination button 54 effectively doubles the maneuvers that can be conducted.

The combination maneuver designated for a particular action button can be changed merely by producing another sequence in the manner described hereinabove utilizing that particular action button to initiate the maneuver. The entire combination can be erased from the memory for a particular action button by pressing and holding the program button 50 while simultaneously holding one of the analog joy sticks 42, 46 (pressing down like a button) as well as the particular action button that you wish to clear.

It will also be appreciated that, although an embodiment of the present invention has been described in detail, for the purposes of illustration, various modifications may be made without departing from the spirit and scope of the invention. Therefore, the invention is not to be limited, except as by the appended claims.

What is claimed:

1. An input device having an exterior surface, the input device used with a video game for controlling the movement of at least one icon on a display screen during the play of the video game, comprising:
   a plurality of input members provided on the exterior surface of the input device, each of said input members controlling a particular function during the play of the video game;
   a memory device in communication with said input members; and
   a combination maneuver member provided on the exterior surface of the input device and in communication with said memory device, said combination maneuver member used with at least one of said input members to input and memorize a combination maneuver to be maintained in said memory device and subsequently utilizing during the play of the game by enabling at least one of said input members without the loss of said particular function originally assigned to said input members during the play of the game prior to the memorization of said combination maneuver;
   wherein said combination maneuver is activated utilizing both said combination maneuver member and at least one of said input members, each of said input members controlling a particular function during the play of the game, regardless of whether said combination maneuver has been memorized.

2. The input device in accordance with claim 1, wherein said memory device for storing said combination maneuver is non-volatile.

3. The input device in accordance with claim 2, further including a timer used in conjunction with said memory device for limiting the total duration of said combination maneuver.

4. The input device in accordance with claim 3, wherein said total duration of said combination maneuver is five seconds.

5. The input device in accordance with claim 1, wherein said input members are digital.

6. The input device in accordance with claim 5, wherein said combination maneuver is produced using at least two of said input members, with the time duration between enabling said input members included in said combination maneuver.

7. The input device in accordance with claim 1, further including a light emitting device used with said combination maneuver member.

8. The input device in accordance with claim 7, wherein said light emitting device flashes at a first rate when one of said input members is engaged and then disengaged when prior to inputting and memorizing said combination maneuver.

9. The input device in accordance with claim 8, wherein said light emitting device flashes at a second rate different than said first rate when said combination maneuver is being memorized.

10. The input device in accordance with claim 1, further including a video game machine provided between the input device and the display screen.

11. The input device in accordance with claim 1, wherein at least a majority of said input members are provided on the right side of the input device to be manipulated by the fingers of the right hand of the user and said combination maneuver member is provided on the left side of the input device to be manipulated by one of the fingers of the left hand of the user.

12. A method of programming and utilizing a combination maneuver in an input device for a video game used to control the movement of at least one icon on a display screen during the play of the game, the input device provided with n input members, each said n input members used to control a particular function during the play of the game, regardless of whether the combination maneuver has been recorded in a memory device, a program member and a combination maneuver member, comprising the steps of:

engaging and disengaging said program member;
    engaging and disengaging a first of the input members;
    engaging the combination maneuver member;
    creating and maintaining a first combination maneuver in a memory device by engaging and disengaging, in real time during the play of the video game, at least one of said input members; and
    utilizing said first combination maneuver during the play of the game by simultaneously engaging said combination maneuver member and one of said n input members.

13. The method of programming a combination maneuver in accordance with claim 12, comprising the step of:

including a timing device to be used with said memory device to limit the combination maneuver to a fixed time direction.

14. The method of programming a combination maneuver in accordance with claim 12 to create additional combination maneuvers, comprising the steps of:

a) engaging and disengaging said program member;
    b) engaging and disengaging an appropriate one of the input members;
    c) engaging the combination maneuver member;
    d) creating and maintaining an additional combination maneuver in a memory device by engaging and disengaging in real time during the play of the video game at least one of said input members;
    e) repeating steps a), b), c) and d), a plurality of not to exceed n−2 times to create and maintain in memory additional combination maneuvers; and
    f) utilizing each of said additional combination maneuvers during the play of the game by simultaneously engaging said combination maneuver member with a different input member to activate each of said additional combination maneauvers.

15. The method of programming a combination maneuver in accordance with claim 12, wherein said combination maneuver member is engaged by one of the fingers of the left hand of a user and at least one of said input members is engaged by one of the fingers of the right hand of the user.

16. The method in accordance with claim 12, wherein the input device is connected to a source of power, and further wherein said memory device is a nonvolatile memory, thereby allowing the combination maneuver to be recorded in said non-volatile memory, and after the source of power is disconnected from said input device and then reconnected to said input device, said combination maneuver can be employed without rerecorded said combination maneuver in said memory device.

* * * * *

UNITED STATES PATENT AND TRADEMARK OFFICE
CERTIFICATE OF CORRECTION

PATENT NO. : 6,989,818 B2
APPLICATION NO. : 10/657264
DATED : January 24, 2006
INVENTOR(S) : Biheller et al.

Page 1 of 1

It is certified that error appears in the above-identified patent and that said Letters Patent is hereby corrected as shown below:

Col. 6, Claim 1, line 17, change "utilizing" to --utilized--.

Col. 8, Claim 16, line 3, change "nonvolatile" to --non-voltatile--.

Signed and Sealed this

Eighth Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 6,989,818 B2  Page 1 of 1
APPLICATION NO. : 10/289340
DATED : January 24, 2006
INVENTOR(S) : Biheller et al.

It is certified that error appears in the above-identified patent and that said Letters Patent is hereby corrected as shown below:

Col. 6, line 27, change "utilizing" to --utilized--.

Col. 8, line 29, change "nonvolatile" to --non-voltatile--.

This certificate supersedes Certificate of Correction issued August 8, 2006.

Signed and Sealed this

Tenth Day of October, 2006

JON W. DUDAS
*Director of the United States Patent and Trademark Office*